US011257235B2

(12) United States Patent
Wu et al.

(10) Patent No.: US 11,257,235 B2
(45) Date of Patent: *Feb. 22, 2022

(54) EFFICIENT SUB-PIXEL DISPARITY ESTIMATION FOR ALL SUB-APERTURE IMAGES FROM DENSELY SAMPLED LIGHT FIELD CAMERAS

(71) Applicant: Intel Corporation, Santa Clara, CA (US)

(72) Inventors: Yi Wu, San Jose, CA (US); Shaojun Yao, Shangai (CN); Yong Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,784

(22) Filed: Oct. 16, 2020

(65) Prior Publication Data

US 2021/0035317 A1  Feb. 4, 2021

Related U.S. Application Data

(63) Continuation of application No. 16/463,456, filed as application No. PCT/CN2016/111682 on Dec. 23, 2016, now Pat. No. 10,832,430.

(51) Int. Cl.
*G06T 7/557* (2017.01)
*H04N 13/271* (2018.01)
(Continued)

(52) U.S. Cl.
CPC .......... *G06T 7/557* (2017.01); *H04N 13/218* (2018.05); *H04N 13/271* (2018.05); *G06T 2207/10052* (2013.01); *H04N 2013/0081* (2013.01)

(58) Field of Classification Search
CPC .......... G06T 7/557; G06T 2207/10052; H04N 13/271; H04N 13/218; H04N 2013/0081
(Continued)

(56) References Cited

U.S. PATENT DOCUMENTS 10,832,430 B2   11/2020  Wu et al.
2015/0373316 A1  12/2015  Meng et al.
(Continued)

FOREIGN PATENT DOCUMENTS

EP    3065395    9/2016
EP    3094076    11/2016

OTHER PUBLICATIONS

International Bureau, "International Preliminary Report on Patentability," issued in connection with PCT Application No. PCT/CN2016/111682, dated Jun. 25, 2019, 7 pages.
(Continued)

*Primary Examiner* — Allen C Wong
(74) *Attorney, Agent, or Firm* — Hanley, Flight & Zimmerman, LLC

(57) ABSTRACT

A system for sub-pixel disparity estimation is described herein. The system includes memory circuitry to store image data and at least one processor to execute instructions to calculate a first disparity for a set of reference views. The reference views correspond to a first subset of views among a plurality of sub-aperture views represented in the image data. The at least one processor is to refine the first disparity to a second disparity for the reference views. The second disparity has higher precision than the first disparity. The at least one processor is to map the second disparity from the reference views to a second subset of views among the plurality of sub-aperture views different than the first subset of views.

21 Claims, 8 Drawing Sheets

(51) Int. Cl.
*H04N 13/218* (2018.01)
*H04N 13/00* (2018.01)

(58) Field of Classification Search
USPC .......................................... 348/49
See application file for complete search history.

(56) References Cited

U.S. PATENT DOCUMENTS

| | | |
|---|---|---|
| 2016/0148386 A1 | 5/2016 | Seifi et al. |
| 2016/0337632 A1 | 11/2016 | Vandame et al. |
| 2016/0360182 A1 | 12/2016 | Seifi et al. |
| 2018/0041762 A1* | 2/2018 | Ikai ..................... H04N 19/172 |
| 2018/0144492 A1* | 5/2018 | Vandame ............. H04N 13/111 |
| 2019/0166335 A1* | 5/2019 | Drazic .................... H04N 9/07 |

OTHER PUBLICATIONS

United States Patent and Trademark Office "Notice of Allowance and Fee(s) Due," issued in connection with U.S. Appl. No. 16/463,456, dated Jul. 8, 2020, 9 pages.

* cited by examiner

300

500

EFFICIENT SUB-PIXEL DISPARITY ESTIMATION FOR ALL SUB-APERTURE IMAGES FROM DENSELY SAMPLED LIGHT FIELD CAMERAS

CROSS-REFERENCE TO RELATED APPLICATIONS

This patent arises from a continuation of U.S. patent application Ser. No. 16/463,456 (now U.S. Pat. No. 10,832, 430), filed on May 23, 2019, which is a National Stage Entry of, and claims priority to, International PCT Application No. PCT/CN2016/111682, filed on Dec. 23, 2016. The contents of the aforementioned applications and patents are hereby incorporated herein by reference in their entireties for all purposes. Priority to U.S. patent application Ser. No. 16/463, 456 and International PCT Application No. PCT/CN2016/ 111682 is hereby claimed.

BACKGROUND ART

A plenoptic camera, also known as a light field camera, captures information about the light field originating from a scene. The information includes values representing the intensity of light in a scene and also the direction that the light rays are traveling in space. This light field capture is in contrast with capture by a conventional camera, which captures only light intensity. A plenoptic camera enables the capture of multiple images via image processing to extract these sub-aperture images. In some cases, the image sensor of the plenoptic camera can be divided into a plurality of micro lenses, each with a sub-aperture that is to capture an image.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
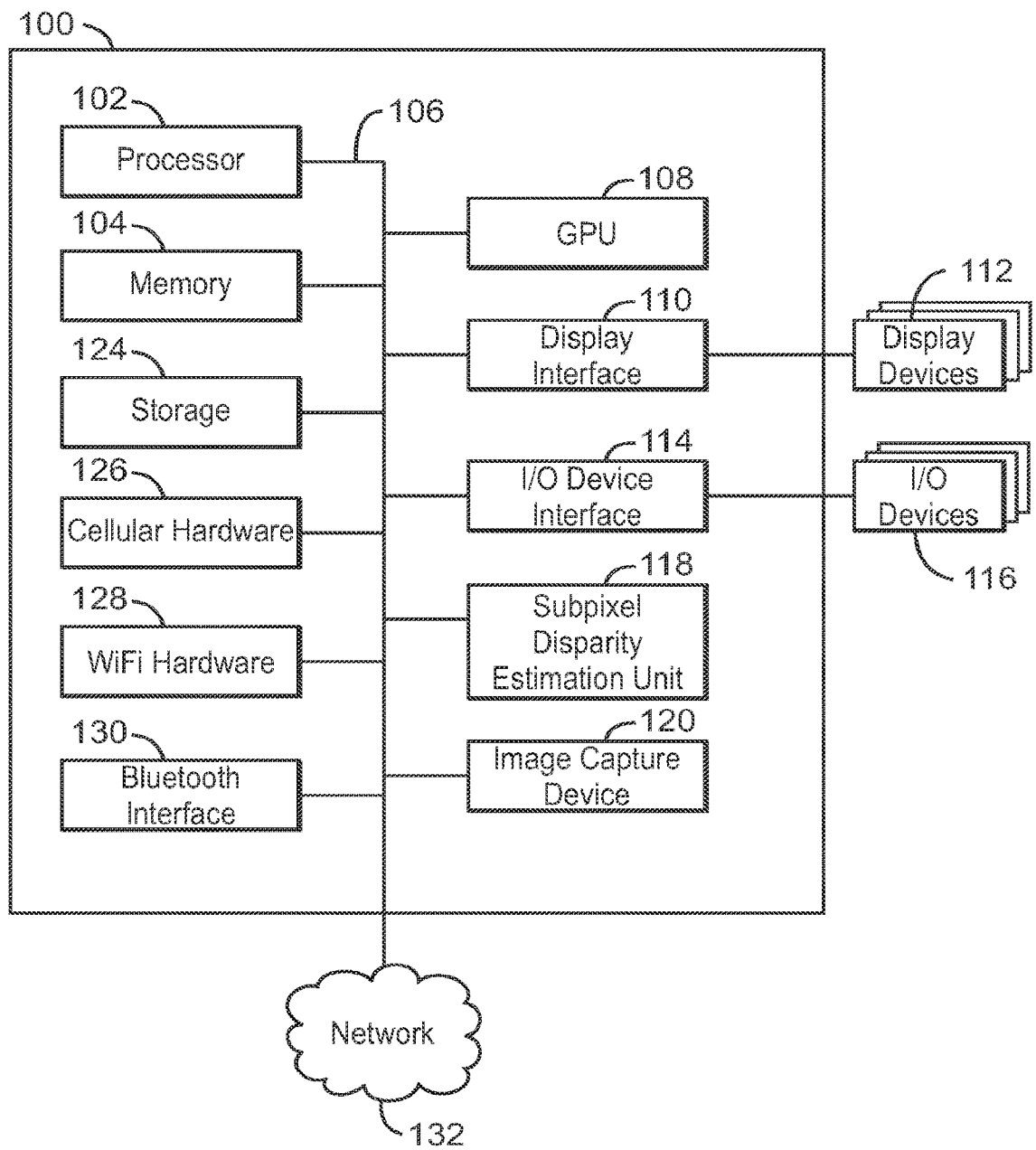
FIG. 1 is a block diagram of an electronic device that enable efficient sub-pixel disparity estimation for all sub-aperture images from densely sampled light field cameras.

As discussed above, plenoptic cameras capture information including, at least in part, values representing the intensity of light in a scene and also the direction that the light rays are traveling in space. The additional directional information of the light rays enable a depth map of a scene to be estimated. High quality depth maps from all sub-aperture images from a plenoptic camera provide content to render for applications that require a depth map with values for most pixel locations. These applications include virtual reality displays, light filed three-dimensional (3D) displays, and the like. Further, these depth maps may enable many applications with a compelling user experience, including depth-of-field manipulation, matting and selection, surface reconstruction, and the like. Often, depth maps are generated based on a disparity estimation for each pixel.

Typical light field cameras or plenoptic cameras may capture many dense views of a scene in one single shot, which can result in over 100 different views. Every view captured by the light field camera is of the scene from a viewpoint that corresponds to a small fraction of the camera aperture. Generating a disparity representation for the potential hundreds of views from the sub-aperture images can be quite time consuming. In embodiments, the disparity is a measure of a difference in location of a pixel or region from one image to another image. Thus, the disparity may be the difference between the corresponding points of left and right images in a pair of images from a plenoptic camera. The disparity may be used for applications such as 3D depth extraction, refocus, measurement, layer effect, view interpolation, and the like. The disparity values may correspond to integer coordinate locations for each pixel. To reduce the time it takes to find the disparity representations, some applications provide depth maps for only the center sub-aperture image to reduce the computational cost. However, the lack of disparity values and the resulting depth map from other views and angles limits the user experience.

Embodiments described herein enable efficient sub-pixel disparity estimation for all sub-aperture images from densely sampled light field cameras. In embodiments, integer disparity is calculated. In some cases, integer disparity refers to a level of precision of the disparity calculation. The integer disparity may be refined to a sub-pixel disparity precision, which may comprise a floating-point value. Disparity can be propagated from neighboring views for pixels between sub-aperture images because of a high redundancy due to small baselines between the neighboring views.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device that enable efficient sub-pixel disparity estimation for all sub-aperture images from densely sampled light field cameras. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes video data.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

A sub-pixel disparity estimation unit 118 may be used to determine the correspondences between positions and/or pixels within the respective reference sub-aperture images. As used herein, sub-aperture images may also be referred to as sub-aperture views. Based on such correspondences, depths may be estimated for objects and/or features associated with those positions and/or pixels. The accuracy with which such correspondences may be determined can depend on assumed homogeneity between image pairs. In embodiments, the reference sub-aperture views are selected based on spatial coverage across a plurality of sub-aperture views. For example, with respect to distance, the reference views may be selected such that each other view is no more than two views away (in distance) from a reference view, where the views are arranged in a grid-like fashion.

The electronic device 100 also includes an image capture device 120 for capturing a plurality of images. In embodiments, the image capture device may be a plenoptic camera for capturing a plurality of images. In embodiments, the plenoptic camera may be a plurality of image capture mechanisms, sensors, or any combination thereof. Accordingly, the sensor may be a depth sensor, an image sensor such as a charge-coupled device (CCD) image sensor, a complementary metal-oxide-semiconductor (CMOS) image sensor, a system on chip (SOC) image sensor, an image sensor with photosensitive thin film transistors, or any combination thereof. The image capture device 120 may capture the plurality of images via sub-apertures that are to each capture multiple views of a scene at the same point in time. The image capture device 120 can include any number of cameras or sensors.

The electronic device may also include a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 132 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

These present techniques enable a framework to efficiently and accurately calculate accurate sub-pixel disparity for all sub-aperture images from densely sampled light field cameras. As used herein, sub-pixel disparity comprises a higher pixel precision, even though the initial data points are obtained from an integer pixel space. Accordingly, integer disparity is first calculated from the pixels, and then the integer disparity is refined to sub-pixel disparity accuracy. With this two-step approach, the present techniques have following advantages. First, the present techniques provide flexibility to use any integer disparity algorithm and sub-pixel disparity algorithm separately. Due to the propagation described herein, the algorithms for integer disparity and sub-pixel disparity are not limited to computationally efficient algorithms. The result is highly accurate disparity representations that can be propagated to other views. A second advantage is that the integer disparity calculation is usually much faster than sub-pixel disparity calculation. With an initial integer disparity output, for the sub-pixel refinement, the present techniques only need to look for a small range of sub-pixel disparity values around the initial value instead of searching the entire space with a computationally expensive sub-pixel disparity calculation. This results in a faster sub-pixel disparity calculation due to the search space being limited. In embodiments, refining the integer precision to sub-pixel precision may include refining an integer value to a 14-bit floating point precision value.

In the sub-aperture images, the baseline between each of the sub-aperture images from a light field camera is very narrow. The baseline may refer to the distance between the aperture center of each sub-aperture image to another sub-aperture image or a reference image. Pixels between sub-aperture images have high redundancy due to these small baselines, resulting in no need for a disparity calculation at each view. Instead, disparity is propagated from neighboring views to save computational time. Thus, the disparity can be propagated from the sub-pixel precision disparity estimation to other sub-aperture views that were not included in the disparity estimation using the reference views.

Figure 2:
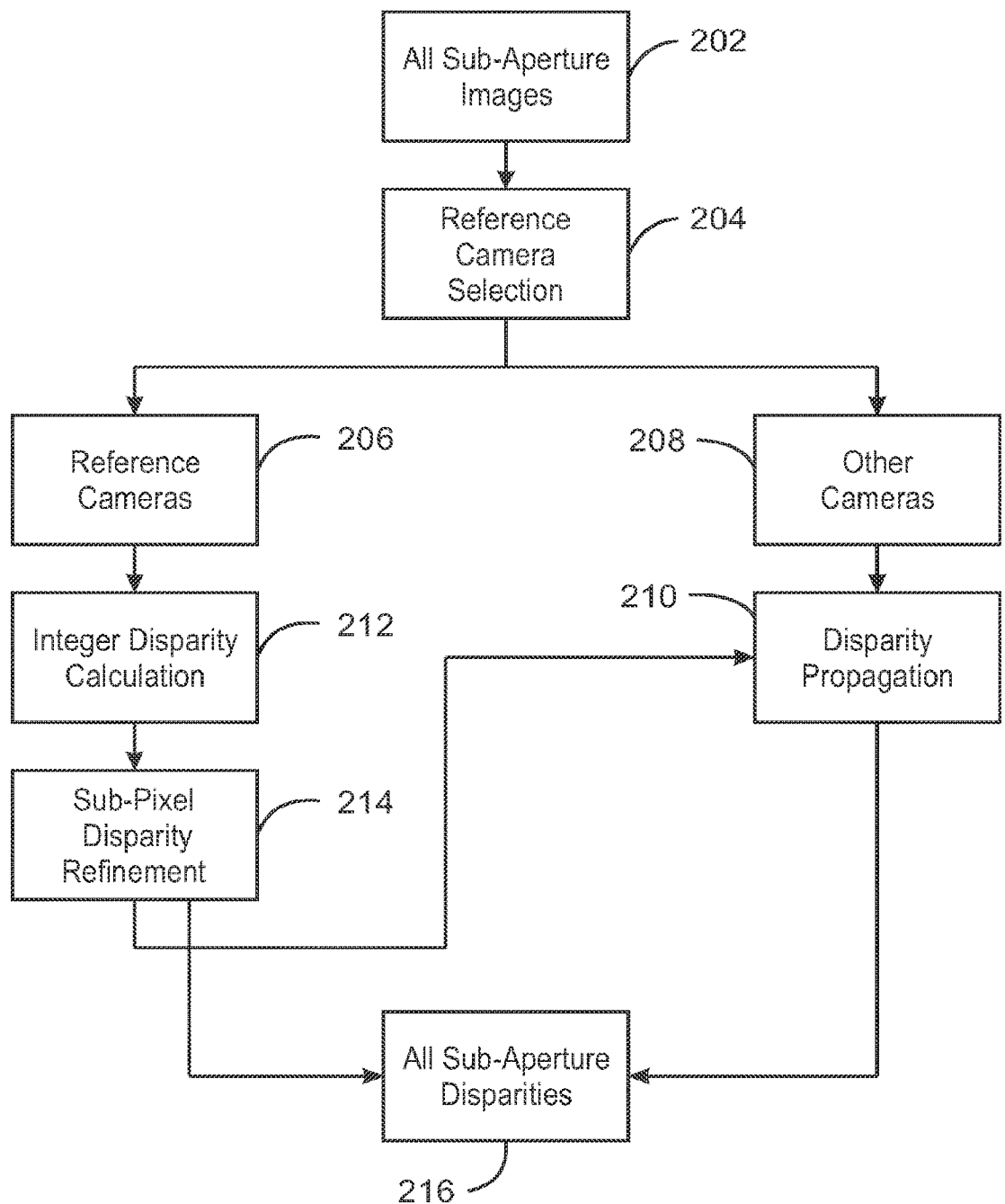
FIG. 2 is a process flow diagram of a method for enabling a framework for light field sub-pixel disparity.

FIG. 2 is a process flow diagram of a method 200 for enabling a framework for light field sub-pixel disparity. At block 202, all sub-aperture images are obtained from an image capture device. Given all of the sub aperture images, at block 204 reference cameras views are selected based on the sub-aperture images. In particular, reference cameras views may be selected on a spatial basis. For example, reference camera views may be determined by skipping a predetermined number of sub-aperture views in both a vertical direction and a horizontal direction such that each other sub-aperture view is within a threshold distance to a reference view. In embodiments, an algorithm may be used to select a subset of camera views as reference views for disparity calculation. In particular, the algorithm may ensure that each view is within a prescribed distance of a reference view no matter the layout of the sub-aperture views.

At block 206, the reference camera view processing begins, and at block 208 other camera view processing begins. At block 212, an integer disparity calculation is calculated using multi-baseline stereo vision algorithm such or any integer disparity algorithm. For example, integer disparity may be calculated based on comparing the reference camera views to a set of other reference camera views individually, and then aggregating the comparisons using a multi-baseline mechanism. In embodiments, in the multi-baseline mechanism, disparity calculations are performed on pairs of the reference camera views. For each pair of camera images, a pixel-wise absolute difference is taken using features at each candidate disparity d and aggregated differences among all camera pairs. The result is then a disparity map which provides a value for each pixel.

Once the integer disparity is calculated, at block 214, a sub-pixel disparity algorithm refines the integer disparity output in a small neighborhood of the integer disparity. Since the search range for refinement is a small range instead of whole search space, a computationally "expensive" sub-pixel disparity algorithm can be used. Computationally expensive refers to the number of clock cycles used to process the data values. In particular, sub-pixel disparity estimation comprises determining a measured horizontal disparity factor and a measured vertical disparity factor for the integer disparity. Next, a composite horizontal disparity factor for the integer disparity based on the measured horizontal disparity factor and an implied horizontal disparity factor is determined. Also, a composite vertical disparity factor for the integer disparity based on the measured vertical disparity factor is determined along with an implied vertical disparity factor. In this manner, the various rectified images of the rectified image array may be more accurately combined.

At block 208, processing for cameras other than the reference cameras begins. While the process flow has been described sequentially, the process flow may occur in parallel. At block 210, the sub-pixel disparity is propagated from the reference views based on the results of the sub-pixel disparity algorithm. Propagation may be performed as by first remapping the disparity values and then normalizing the disparity values. During remapping, since the estimated disparity values are at a floating-point precision, source pixels from the disparity representations are mapped to non-integer pixels in the target disparity $T_D$, which is then translated to four integer pixels closest to that mapped non-integer pixel in a target disparity map. The mapped disparity values are then normalized. At block 216, all sub-aperture disparities are output for further use. For example, the sub-aperture disparities may be used in virtual reality or augmented reality applications.

Figure 3:
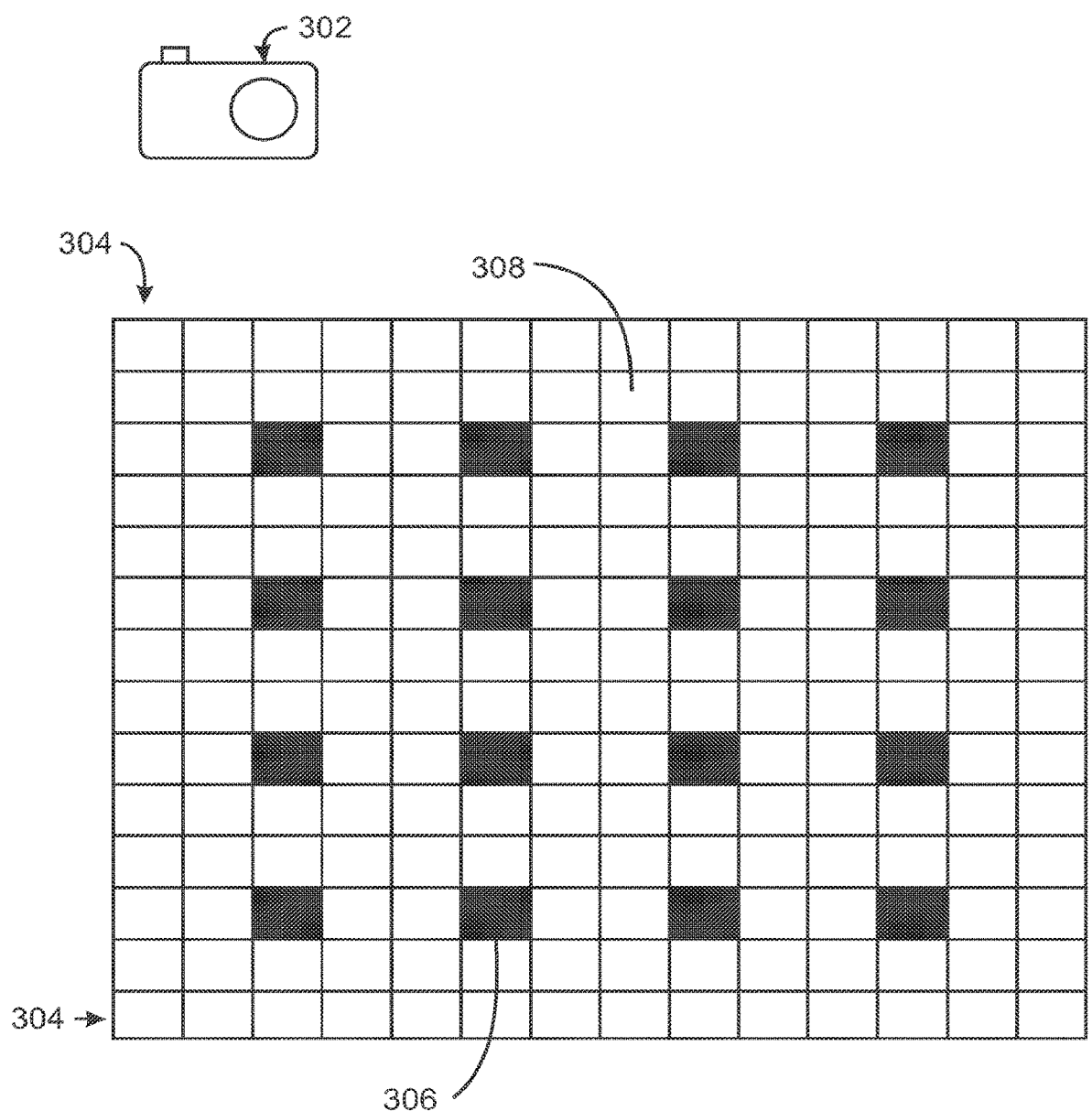
FIG. 3 is an illustration of a light field image captured by a plenoptic camera.

FIG. 3 is an illustration of a light field image 300 captured by a plenoptic camera 302. The plenoptic camera may include an image sensor that is to capture the light field of a scene. The light field image may be divided into a plurality of sub-apertures. Each sub-aperture may be considered a micro-lens, capable of capturing the light field information of a scene at slightly different views at the same point in time.

The plenoptic camera 302 is illustrated as including a 14×14 grid of sub-apertures 304 for a total of 196 sub-apertures 304. To estimate the disparity for each of the 196 sub-apertures may be time consuming. To mitigate the amount of time it takes to compute a disparity estimation for all sub-aperture images, a disparity estimation may be calculated for only the center sub-aperture image. However, calculating the disparity estimation of one sub-aperture image results in a very coarse depth representation unsuitable for use with virtual reality or other applications.

The present techniques enables a disparity estimation to be calculated for all sub-aperture images via disparity estimations on a subset of reference images and then propagating the disparity estimation from the subset of reference images to all images. A plurality of reference views 306 from the sub-aperture views 304 may be selected from the sub-aperture images 304. The plurality of other views of sub-aperture images 308 are illustrated as white squares, while the plurality of reference views of sub-aperture images 306 are illustrated as black squares.

Figure 4:
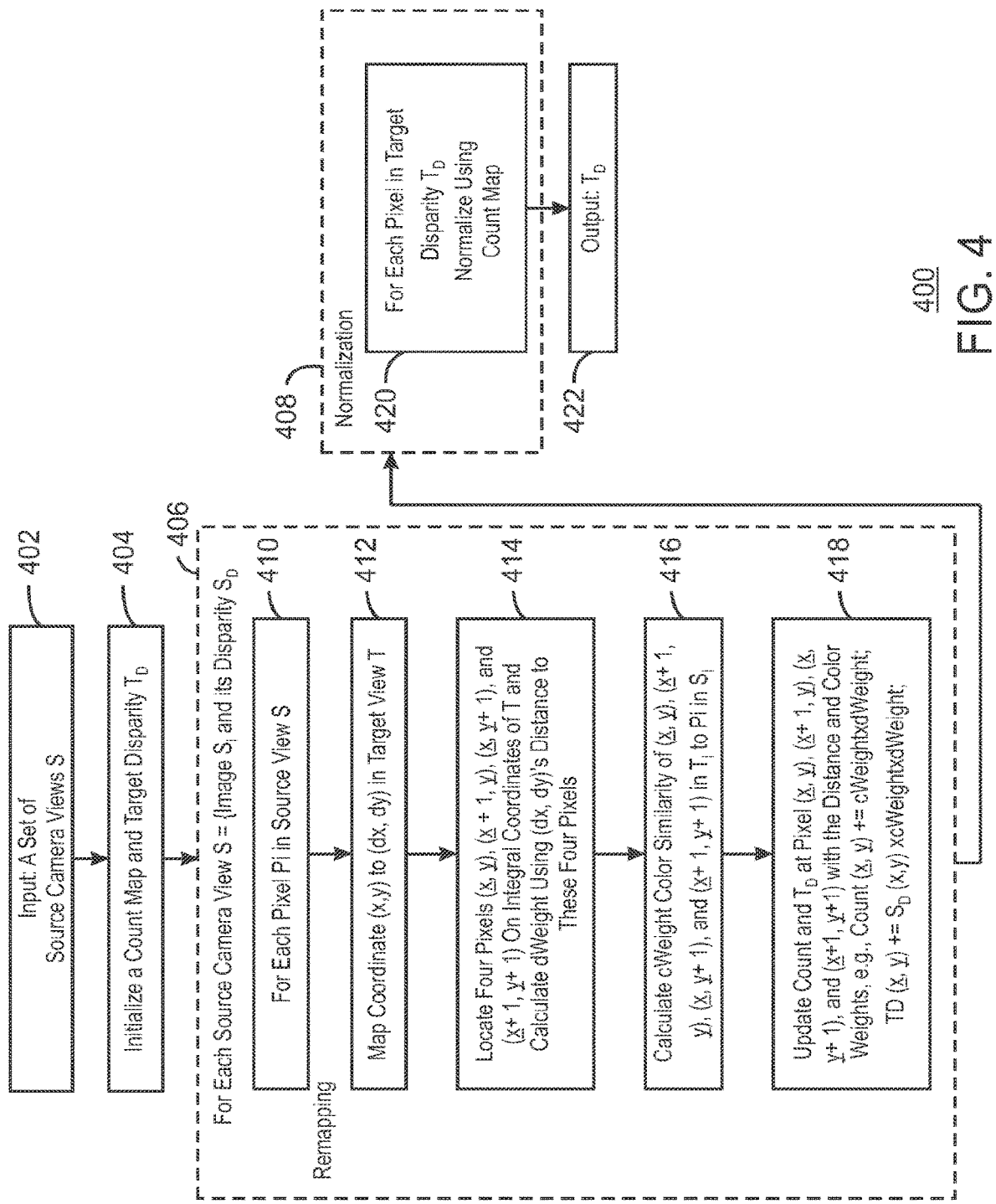
FIG. 4 is a process flow diagram of a method for disparity propagation.

FIG. 4 is a process flow diagram of a method 400 for disparity propagation. In embodiments, the disparity propagation is the disparity propagation at block 210 of FIG. 2. The disparity propagation may be referred to as weighted forward remapping. At block 402, a set of source camera views {S} whose disparities have already been calculated is obtained. In embodiments, the set of source camera views {S} may be obtained from sub-pixel disparity refinement at block 214 of FIG. 2, and can be considered reference views. These disparities are to be propagated to an unknown view T. At block 404, a target disparity $T_D$ and a count map may be initialized. In embodiments, initializing refers to setting the target disparity and the count map equal to zero.

Disparity propagation includes a remapping portion 406 and a normalization portion 408. Remapping 406 includes determining a floating-point precision target disparity $T_D$ that can be mapped from a set of source camera views {S}. Normalization 408 includes adjusting each pixel value in the target disparity $T_D$ to a common scale.

At block 410, each pixel $P_I$ in a source view S is obtained. At block 412, for each source view S, a pixel $P_I(x,y)$ maps to pixel (dx,dy) in target view T using the following equation:

$$dx=x+SD(y,x)*viewHorOffset$$

$$dy=y+SD(y,x)*viewVertOffset$$

where SD(y,x) is the disparity value of pixel (y,x) of S, viewHorOffset is the number of view spacing from S to T in the horizontal direction, and viewViewOffset is view spacing from S to T in the vertical direction.

Since disp(y,x) is a sub-pixel disparity value, the mapped (dx,dy) calculated at block 412 is on non-integer or non-integral coordinates. The non-integral coordinates correspond to four pixels with the integer coordinates as follows:

(x,y)

(x+1,y)

Figure 5:
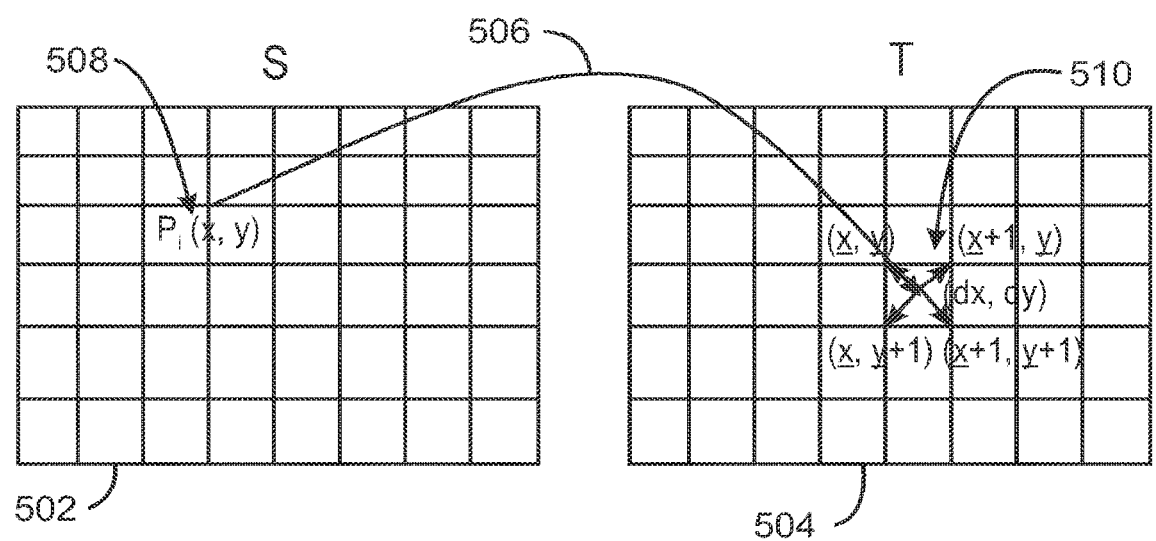
FIG. 5 is an illustration of determining the four pixels with integral coordinates.

(x,y+1), and (x+1,y+1)

where x=floor(dx) and y=floor(dy) as illustrated at FIG. 5. At block 414, these four pixels are located in the target space T and a dWeight is calculated using the distance of (dx,dy) to each of the four pixels. Note that (dx,dy) is a floating value, and the floating precision is mapped to four integer coordinate locations.

Figure 6:
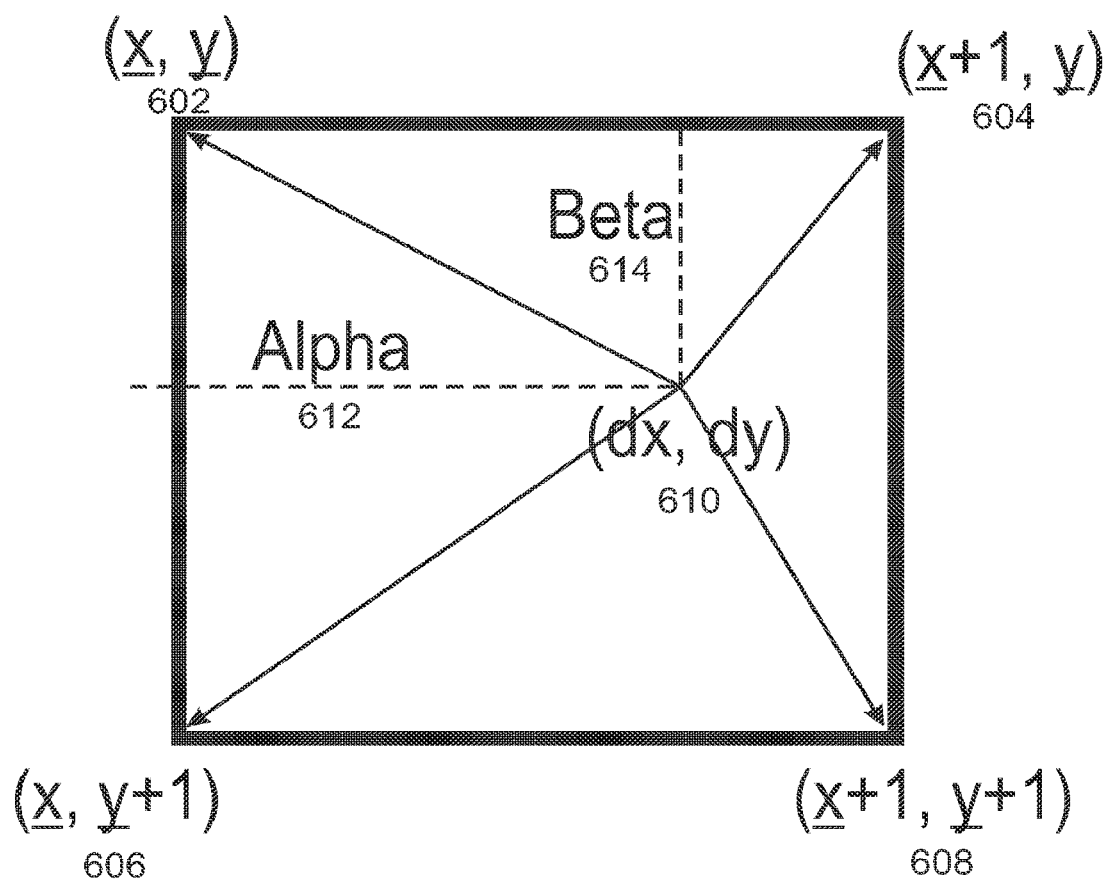
FIG. 6 is an illustration of a sub-aperture view.

In particular, the disparity value of pixel $P_I(x,y)$ in S contributes to the four integral pixels in T with two weights: dWeight and cWeight. The dWeight is based on a distance from (dx,dy) to these four pixels, while cWeight is based on the color images. The closer (dx,dy) is one of the pixels, the higher the weight is. As shown in FIG. 6, the upper-left pixel 602 (x,y)'s distance to pixel (dx,dy) is alpha=dx−x horizontally, and beta=dy−y vertically.

The upper-left pixel 602 (x,y)'s dWeight=(1.0−alpha)*(1.0−beta). The upper-left pixel 604 (x+1,y)'s dWeight=alpha*(1.0−beta). The lower-left pixel 606 (x,y+1)'s dWeight=beta*(1.0−alpha). The lower-right pixel 608 (x+1, y+1)'s dWeight=alpha*beta.

At block, 416 the cWeight may be calculated based on a color similarity. In particular, there could be multiple source images {S} mapped to a target disparity T. Some pixels in T might be occluded in certain images of {S} but visible in others. To enable a more robust remapping to deal with noise and pixel occlusion, a color similarity of source pixel x,y is computed in $S_I$ to four integral pixels in $T_I$. The higher the color similarity is, the higher the cWeight.

At block 418, count and $T_D$ is updated for the group of pixels (x,y), (x+1,y), (x,y+1), and (x+1,y+1) with the distance weight (dWeight) and the color weight (cWeight). Specifically, with respect to the first pixel (x,y), count and $T_D$ may be updated as follows:

count(x,y)+=cWeight×dWeight $T_D(x,y)$+=SD(x,y)×cWeight×dWeight

The remaining count and $T_D$ for the group of four pixels may be updated in a similar fashion.

Once all the source camera views' remapping is completed, $T_D$ is normalized by count map. The normalized $T_D$ is the disparity map of target camera view T. At block 420, for each pixel in the target disparity $T_D$ is normalized by a count map. Normalization using a count map may include determining an average by dividing the target disparity by its count map values. At block 422, the target disparity $T_D$ is output.

FIG. 5 is an illustration of determining the four pixels with integral coordinates that correspond to the mapped (dx,dy). FIG. 5 includes a reference source view 502 and a target view 504. The source view 502 represents a known disparity, while the target view 504 represents a target disparity. A $P_I(dx,dy)$ 508 in the source view 502 maps to the point 510 (dx,dy) in the target disparity map $T_D$ 504, and as illustrated the point 510 does not map directly to any integer coordinate location. As discussed earlier, point 510 (dx,dy) contributes to the disparity of the four integer pixels pixels (x,y), (x+1, y), (x,y+1), and (x+1,y+1) in the target disparity $T_D$.

FIG. 6 is an illustration of a sub-aperture view 600 with weight determination for the four integer pixels. In particular, a distance alpha 612 and a distance beta 614 is used to locate the mapped point 610 (dx,dy) within the view 600. The distances to each of the points 602, 604, 606, and 608 is determined and used to weight the amount that the mapped point 610 (dx,dy) contributes to the target disparity for the respective integer point.

The present techniques can efficiently and accurately generate depth maps for all sub-aperture images from densely sampled light field cameras. A high-quality depth map can be produced as a result of using more than a single disparity representation for only a center view. The sub-pixel precision of techniques using only center disparity representations to obtain depth maps is far coarser and low quality when compared to the floating sub-pixel precision that is obtained according to the present techniques. Moreover, the present techniques are less noisy when compared to other disparity estimation techniques. Further, other techniques only generate one view—however multiple views are often needed for current applications. The present techniques enable the use of more than just a center depth map through the propagation described herein. The generated depth map is high quality when compared to those depth maps that use only the center depth image.

Figure 7:
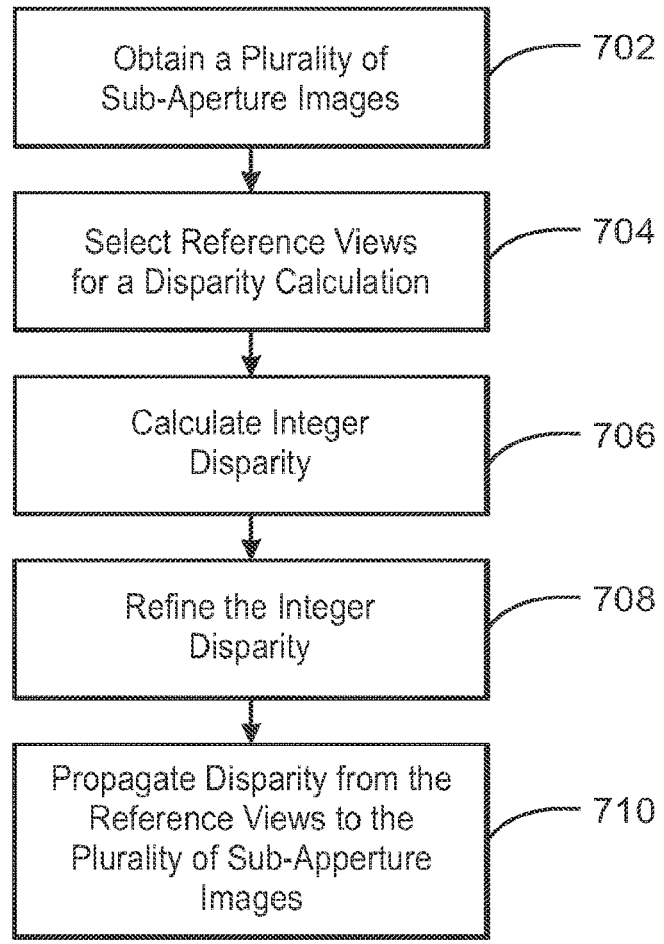
FIG. 7 is a process flow diagram of a method for disparity estimation.

FIG. 7 is a process flow diagram of a method 700 for disparity estimation. At block 702, a plurality of sub-aperture images is obtained. The plurality of images may include multiple images of the same scene as captured by a plurality of cameras in a plenoptic camera. The plenoptic camera may be in any position, such as planar, linear, and circular. At block 704, a plurality of reference views for a disparity calculation are calculated. In embodiments, the reference views may be selected to ensure adequate spatial coverage. Adequate spatial coverage may be a threshold coverage which specifies that each other camera view can be no more than X views away from a reference camera view. At block 706, the integer disparity is calculated. The integer disparity may be calculated according to a using multi-baseline stereo vision algorithm such or any integer disparity algorithm. At block 708, the integer disparity is refined. The refined integer disparity may result in sub-pixel disparity values. At block 710, the sub-pixel disparity values are propagated from the reference views to the remainder of the plurality of sub-aperture images.

Figure 8:
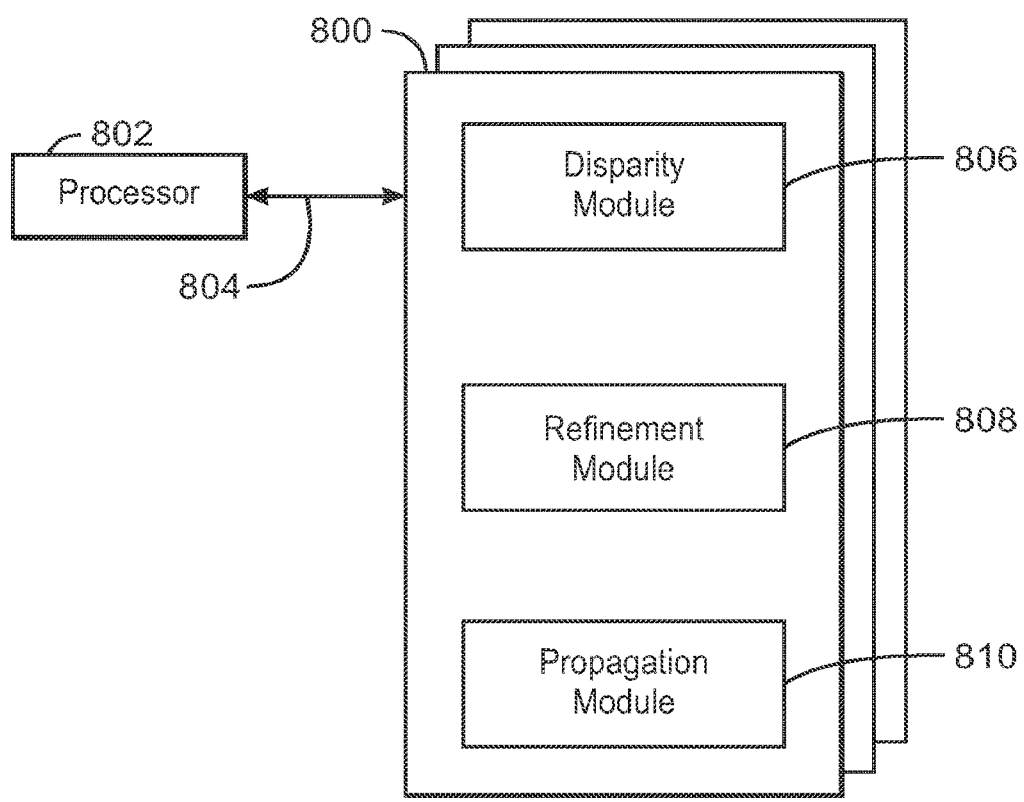
FIG. 8 is a block diagram showing media that contains logic for disparity estimation.

FIG. 8 is a block diagram showing media 800 that contains logic for disparity estimation. The media 800 may be a computer-readable medium, including a non-transitory medium that stores code that can be accessed by a processor 802 over a computer bus 804. For example, the computer-readable media 800 can be volatile or non-volatile data storage device. The media 800 can also be a logic unit, such as an Application Specific Integrated Circuit (ASIC), a Field Programmable Gate Array (FPGA), or an arrangement of logic gates implemented in one or more integrated circuits, for example.

The media 800 may include modules 806-810 configured to perform the techniques described herein. A disparity estimation module 810 may be configured to estimate image disparity using a set of reference views. At block 808, the estimated disparity for the reference views is refined to an integer disparity. At block 810, the refined disparity is propagated to the other sub-aperture views. In some embodiments, the modules 806-810 may be modules of computer code configured to direct the operations of the processor 802.

The block diagram of FIG. 8 is not intended to indicate that the media 800 is to include all of the components shown in FIG. 8. Further, the media 800 may include any number of additional components not shown in FIG. 8, depending on the details of the specific implementation.

Example 1 is a system for sub-pixel disparity estimation. The system includes a plenoptic camera; a memory configured to store imaging data; and a processor coupled to the memory and the plenoptic camera, the processor to: obtain a plurality of sub-aperture views; select a subset of sub-aperture views as reference views for a disparity calculation; calculate an integer disparity for the reference views; refine the integer disparity to sub-pixel disparity accuracy for the reference views; and propagate the sub-pixel disparity from the reference views to other views of the plurality of sub-aperture views.

Example 2 includes the system of example 1, including or excluding optional features. In this example, the integer disparity is calculated for the reference views using a multi-baseline stereo algorithm.

Example 3 includes the system of any one of examples 1 to 2, including or excluding optional features. In this example, the sub-pixel disparity algorithm refines the integer disparity in a neighborhood of the integer disparity.

Example 4 includes the system of any one of examples 1 to 3, including or excluding optional features. In this example, the sub-pixel disparity is propagated according to weighted forward remapping.

Example 5 includes the system of any one of examples 1 to 4, including or excluding optional features. In this example, the sub-pixel disparity is of a floating point precision.

Example 6 includes the system of any one of examples 1 to 5, including or excluding optional features. In this example, a depth map is generated based on the sub-pixel disparity for the reference views and the propagated disparity.

Example 7 includes the system of any one of examples 1 to 6, including or excluding optional features. In this example, the propagated sub-pixel disparity is remapped and normalized to integer pixel coordinates.

Example 8 includes the system of any one of examples 1 to 7, including or excluding optional features. In this example, the plenoptic camera captures multiple sub-aperture views of a single scene.

Example 9 includes the system of any one of examples 1 to 8, including or excluding optional features. In this example, the plenoptic camera is a planar, linear, or circular camera array.

Example 10 includes the system of any one of examples 1 to 9, including or excluding optional features. In this example, a distance weight and a color weight are used to the sub-pixel disparity from the reference views to other views of the plurality of sub-aperture views.

Example 11 is a method for sub-pixel disparity estimation. The method includes obtaining a plurality of sub-aperture views; selecting a subset of sub-aperture views as reference views for a disparity calculation; calculating an integer disparity for the reference views; refining the integer disparity to sub-pixel disparity accuracy for the reference views; and propagating the sub-pixel disparity from the reference views to other views of the plurality of sub-aperture views.

Example 12 includes the method of example 11, including or excluding optional features. In this example, the integer disparity is calculated by determining disparities from a reference view to a set of other reference views via a multi-baseline disparity estimation then aggregating costs between all reference camera pairs and then determining a disparity corresponding to a minimum cost. Optionally, method of claim 12, where the minimum cost comprises minimizing a cost function among all reference camera pairs. Optionally, the multiple baseline disparity estimation is performed by computing the sum of squared difference (SSD) values.

Example 13 includes the method of any one of examples 11 to 12, including or excluding optional features. In this example, refining the integer disparity removes noise and low confidence disparity values.

Example 14 includes the method of any one of examples 11 to 13, including or excluding optional features. In this example, the reference views are selected from the sub-aperture views based on spatial coverage, wherein each other view is within a predetermine distance of the reference view.

Example 15 includes the method of any one of examples 11 to 14, including or excluding optional features. In this example, disparity values are propagated to other view by remapping the calculated sub-pixel disparity values from the reference views to a target disparity.

Example 16 includes the method of any one of examples 11 to 15, including or excluding optional features. In this example, the sub-pixel disparity is remapped to a target disparity via weights applied to a set of neighboring pixels in a target disparity map.

Example 17 includes the method of any one of examples 11 to 16, including or excluding optional features. In this example, disparity propagation is according to weighted forward mapping to generate a plurality of depth representations for each of the plurality of sub-aperture views.

Example 18 includes the method of any one of examples 11 to 17, including or excluding optional features. In this example, the estimate of disparity is used to generate a plurality of depth values for virtual reality or augmented reality applications.

Example 19 is an apparatus for sub-pixel disparity estimation. The apparatus includes a plenoptic camera to capture a plurality of views; a reference view mechanism to select a subset of sub-aperture views as reference views for a disparity calculation; a controller to calculate an integer disparity for the reference views and refine the integer disparity to sub-pixel disparity accuracy for the reference views; and a propagation mechanism to propagate the sub-pixel disparity from the reference views to other views of the plurality of sub-aperture views.

Example 20 includes the apparatus of example 19, including or excluding optional features. In this example, the integer disparity is calculated for the reference views using a multi-baseline stereo algorithm.

Example 21 includes the apparatus of any one of examples 19 to 20, including or excluding optional features. In this example, the sub-pixel disparity algorithm refines the integer disparity in a neighborhood of the integer disparity.

Example 22 includes the apparatus of any one of examples 19 to 21, including or excluding optional features. In this example, the sub-pixel disparity is propagated according to weighted forward remapping.

Example 23 includes the apparatus of any one of examples 19 to 22, including or excluding optional features. In this example, the sub-pixel disparity is of a floating point precision.

Example 24 includes the apparatus of any one of examples 19 to 23, including or excluding optional features. In this example, a depth map is generated based on the sub-pixel disparity for the reference views and the propagated disparity.

Example 25 includes the apparatus of any one of examples 19 to 24, including or excluding optional features. In this example, the propagated sub-pixel disparity is remapped and normalized to integer pixel coordinates.

Example 26 includes the apparatus of any one of examples 19 to 25, including or excluding optional features. In this example, the plenoptic camera captures multiple sub-aperture views of a single scene.

Example 27 includes the apparatus of any one of examples 19 to 26, including or excluding optional features. In this example, the plenoptic camera is a planar, linear, or circular camera array.

Example 28 includes the apparatus of any one of examples 19 to 27, including or excluding optional features. In this example, a distance weight and a color weight are used to the sub-pixel disparity from the reference views to other views of the plurality of sub-aperture views.

Example 29 is a tangible, non-transitory, computer-readable medium. The computer-readable medium includes instructions that direct the processor to obtain a plurality of sub-aperture views; select a subset of sub-aperture views as reference views for a disparity calculation; calculate an integer disparity for the reference views; refine the integer disparity to sub-pixel disparity accuracy for the reference views; and propagate the sub-pixel disparity from the reference views to other views of the plurality of sub-aperture views.

Example 30 includes the computer-readable medium of example 29, including or excluding optional features. In this example, the integer disparity is calculated by determining disparities from a reference view to a set of other reference views via a multi-baseline disparity estimation then aggregating costs between all reference camera pairs and then determining a disparity corresponding to a minimum cost. Optionally, computer readable medium of claim 32, where the minimum cost comprises minimizing a cost function among all reference camera pairs. Optionally, the multiple baseline disparity estimation is performed by computing the sum of squared difference (SSD) values.

Example 31 includes the computer-readable medium of any one of examples 29 to 30, including or excluding optional features. In this example, refining the integer disparity removes noise and low confidence disparity values.

Example 32 includes the computer-readable medium of any one of examples 29 to 31, including or excluding optional features. In this example, the reference views are selected from the sub-aperture views based on spatial coverage, wherein each other view is within a predetermine distance of the reference view.

Example 33 includes the computer-readable medium of any one of examples 29 to 32, including or excluding optional features. In this example, disparity values are propagated to other view by remapping the calculated sub-pixel disparity values from the reference views to a target disparity.

Example 34 includes the computer-readable medium of any one of examples 29 to 33, including or excluding optional features. In this example, the sub-pixel disparity is remapped to a target disparity via weights applied to a set of neighboring pixels in a target disparity map.

Example 35 includes the computer-readable medium of any one of examples 29 to 34, including or excluding optional features. In this example, disparity propagation is according to weighted forward mapping to generate a plurality of depth representations for each of the plurality of sub-aperture views.

Example 36 includes the computer-readable medium of any one of examples 29 to 35, including or excluding optional features. In this example, the estimate of disparity is used to generate a plurality of depth values for virtual reality or augmented reality applications.

Example 37 is an apparatus for sub-pixel disparity estimation. The apparatus includes instructions that direct the processor to a plenoptic camera to capture a plurality of views; a reference view mechanism to select a subset of sub-aperture views as reference views for a disparity calculation; a means to calculate an integer disparity for the reference views and refine the integer disparity to sub-pixel disparity accuracy for the reference views; and a means to propagate the sub-pixel disparity from the reference views to other views of the plurality of sub-aperture views.

Example 38 includes the apparatus of example 37, including or excluding optional features. In this example, the integer disparity is calculated for the reference views using a multi-baseline stereo algorithm.

Example 39 includes the apparatus of any one of examples 37 to 38, including or excluding optional features. In this example, the sub-pixel disparity algorithm refines the integer disparity in a neighborhood of the integer disparity.

Example 40 includes the apparatus of any one of examples 37 to 39, including or excluding optional features. In this example, the sub-pixel disparity is propagated according to weighted forward remapping.

Example 41 includes the apparatus of any one of examples 37 to 40, including or excluding optional features. In this example, the sub-pixel disparity is of a floating point precision.

Example 42 includes the apparatus of any one of examples 37 to 41, including or excluding optional features. In this example, a depth map is generated based on the sub-pixel disparity for the reference views and the propagated disparity.

Example 43 includes the apparatus of any one of examples 37 to 42, including or excluding optional features. In this example, the propagated sub-pixel disparity is remapped and normalized to integer pixel coordinates.

Example 44 includes the apparatus of any one of examples 37 to 43, including or excluding optional features. In this example, the plenoptic camera captures multiple sub-aperture views of a single scene.

Example 45 includes the apparatus of any one of examples 37 to 44, including or excluding optional features. In this example, the plenoptic camera is a planar, linear, or circular camera array.

Example 46 includes the apparatus of any one of examples 37 to 45, including or excluding optional features. In this example, a distance weight and a color weight are used to the sub-pixel disparity from the reference views to other views of the plurality of sub-aperture views.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system to estimate sub-pixel disparity, the system comprising:
   memory circuitry to store image data;
   instructions stored in the system; and
   at least one processor circuit to execute instructions to:
      calculate a first disparity for a set of reference views, the reference views corresponding to a first subset of views among a plurality of sub-aperture views represented in the image data;
      refine the first disparity to a second disparity for the reference views, the second disparity having higher precision than the first disparity; and
      map the second disparity from the reference views to a second subset of views among the plurality of sub-aperture views different than the first subset of views.

2. The system of claim 1, wherein the at least one processor circuit is to:
   determine a horizontal disparity factor for the first disparity;
   determine a vertical disparity factor for the second disparity; and
   refine the first disparity to the second disparity based on the horizontal disparity factor and the vertical disparity factor.

3. The system of claim 1, wherein the first disparity is an integer disparity associated with pixels of the reference views, and the second disparity is a sub-pixel disparity associated with sub-pixels of the reference views.

4. The system of claim 1, wherein the at least one processor circuit is to select the first subset of views from among the plurality of sub-aperture views such that ones of the second subset of views are within a threshold distance of ones of the first subset of views.

5. The system of claim 1, wherein the at least one processor circuit is to normalize values of the second disparity mapped to the second subset of views.

6. The system of claim 1, wherein the at least one processor circuit is to:
   calculate a distance weight based on a distance between a pixel in one of the reference views to a plurality of pixels in one of the second subset of views; and
   map the second disparity to the second subset of views based on the distance weight.

7. The system of claim 1, wherein the at least one processor circuit is to:
   calculate a color weight based on a similarity of color between a pixel in one of the reference views to a plurality of pixels in one of the second subset of views; and
   map the second disparity to the second subset of views based on the color weight.

8. At least one storage device comprising instructions that, when executed, cause at least one processor to at least:

calculate a first disparity for a set of reference views, the reference views corresponding to a first subset of views among a plurality of sub-aperture views represented in image data;

refine the first disparity to a second disparity for the reference views, the second disparity having higher precision than the first disparity; and map the second disparity from the reference views to a second subset of views among the plurality of sub-aperture views different than the first subset of views.

9. The at least one storage device of claim 8, wherein the instructions cause the at least one processor to:

determine a horizontal disparity factor for the first disparity;

determine a vertical disparity factor for the second disparity; and refine the first disparity to the second disparity based on the horizontal disparity factor and the vertical disparity factor.

10. The at least one storage device of claim 8, wherein the first disparity is an integer disparity associated with pixels of the reference views, and the second disparity is a sub-pixel disparity associated with sub-pixels of the reference views.

11. The at least one storage device of claim 8, wherein the instructions cause the at least one processor to select the first subset of views from among the plurality of sub-aperture views such that ones of the second subset of views are within a threshold distance of ones of the first subset of views.

12. The at least one storage device of claim 8, wherein the instructions cause the at least one processor to normalize values of the second disparity mapped to the second subset of views.

13. The at least one storage device of claim 8, wherein the instructions cause the at least one processor to:

calculate a distance weight based on a distance between a pixel in one of the reference views to a plurality of pixels in one of the second subset of views; and map the second disparity to the second subset of views based on the distance weight.

14. The at least one storage device of claim 8, wherein the instructions cause the at least one processor to:

calculate a color weight based on a similarity of color between a pixel in one of the reference views to a plurality of pixels in one of the second subset of views; and map the second disparity to the second subset of views based on the color weight.

15. A system for sub-pixel disparity estimation, comprising:

means for storing image data;

means for processing the image data, the processing means to:

calculate a first disparity for a set of reference views, the reference views corresponding to a first subset of views among a plurality of sub-aperture views represented in image data;

refine the first disparity to a second disparity for the reference views, the second disparity having higher precision than the first disparity; and map the second disparity from the reference views to a second subset of views among the plurality of sub-aperture views different than the first subset of views.

16. The system of claim 15, wherein the processing means is to:

determine a horizontal disparity factor for the first disparity;

determine a vertical disparity factor for the second disparity; and refine the first disparity to the second disparity based on the horizontal disparity factor and the vertical disparity factor.

17. The system of claim 15, wherein the first disparity is an integer disparity associated with pixels of the reference views, and the second disparity is a sub-pixel disparity associated with sub-pixels of the reference views.

18. The system of claim 15, wherein the processing means is to select the first subset of views from among the plurality of sub-aperture views such that ones of the second subset of views are within a threshold distance of ones of the first subset of views.

19. The system of claim 15, wherein the processing means is to normalize values of the second disparity mapped to the second subset of views.

20. The system of claim 15, wherein the processing means is to:

calculate a distance weight based on a distance between a pixel in one of the reference views to a plurality of pixels in one of the second subset of views; and map the second disparity to the second subset of views based on the distance weight.

21. The system of claim 15, wherein the processing means is to:

calculate a color weight based on a similarity of color between a pixel in one of the reference views to a plurality of pixels in one of the second subset of views; and map the second disparity to the second subset of views based on the color weight.

\* \* \* \* \*